(12) United States Patent
Lin

(10) Patent No.: US 11,503,687 B1
(45) Date of Patent: Nov. 15, 2022

(54) POWER CONVERTER FOR LED LIGHTING DEVICE

(71) Applicant: Chicony Power Technology Co., Ltd., New Taipei (TW)

(72) Inventor: Chen-Chi Lin, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 17/569,930

(22) Filed: Jan. 6, 2022

(30) Foreign Application Priority Data

Sep. 13, 2021 (TW) .................................. 110134114

(51) Int. Cl.
*H05B 45/37* (2020.01)
*H05B 45/34* (2020.01)

(52) U.S. Cl.
CPC ............. *H05B 45/37* (2020.01); *H05B 45/34* (2020.01)

(58) Field of Classification Search
None
See application file for complete search history.

(56) References Cited

U.S. PATENT DOCUMENTS

| | | | |
|---|---|---|---|
| 8,684,615 B2 | 3/2014 | Koutensky et al. | |
| 2009/0237007 A1 | 9/2009 | Leng | |
| 2016/0073457 A1* | 3/2016 | Nakajo | H05B 45/39 315/223 |
| 2016/0198532 A1* | 7/2016 | Nakajo | H05B 45/14 315/200 R |
| 2017/0238379 A1* | 8/2017 | Duenser | H05B 45/14 315/210 |

FOREIGN PATENT DOCUMENTS

| | | |
|---|---|---|
| CN | 102591391 | 7/2012 |
| TW | 200930147 | 7/2009 |
| TW | M388785 | 9/2010 |
| TW | 201132239 | 9/2011 |
| TW | I461108 | 11/2014 |
| TW | I539863 | 6/2016 |
| TW | M545931 | 7/2017 |
| TW | I662391 | 6/2019 |

\* cited by examiner

*Primary Examiner* — Anh Q Tran
(74) *Attorney, Agent, or Firm* — Andrew M. Calderon; Calderon Safran & Cole, P.C.

(57) ABSTRACT

A power converter for an LED lighting device includes a primary side circuit, a secondary side circuit, a detecting circuit, a load-dependent circuit, and a feedback circuit. The feedback circuit generates a feedback signal according to a detected signal which the detecting circuit generates according to a second node of the secondary side circuit. The primary side circuit adjusts a duty cycle according to the feedback signal. The secondary side circuit outputs a first output voltage at a first node of the secondary side circuit and outputs a second output voltage at a third node of the secondary side circuit, according to the duty cycle of the primary side circuit. The load-dependent circuit receives the second output voltage and controls an electrical strength between the first node and the second node of the secondary side circuit according to the first output voltage.

13 Claims, 8 Drawing Sheets

POWER CONVERTER FOR LED LIGHTING DEVICE

CROSS-REFERENCE TO RELATED APPLICATION

This non-provisional application claims priority under 35 U.S.C. § 119(a) to patent application Ser. No. 11/013,4114 in Taiwan, R.O.C. on Sep. 13, 2021, the entire contents of which are hereby incorporated by reference.

BACKGROUND

Technical Field

The present invention relates to a power converter, and in particular, to a power converter for a light emitting diode (LED for short) lighting device.

Related Art

With the emergence of LEDs, the LEDs are applied to various lighting devices. In order to support LED lamps of different brands, lamp manufacturers need to add corresponding control elements to a driving circuit. Since the control elements can only support the corresponding LED lamps, the lamp manufacturers need to design a plurality of control elements, causing an increase in the costs and inventory.

SUMMARY

In view of this, in some embodiments, a power converter for an LED lighting device includes a primary side circuit, a secondary side circuit, a detecting circuit, a load-dependent circuit, and a feedback circuit. The primary side circuit is configured to adjust a duty cycle of the primary side circuit according to a feedback signal. The secondary side circuit includes a first winding and a second winding. Two ends of the first winding are respectively coupled to a first node and a second node. The second winding is coupled to a third node. The secondary side circuit is configured to output a first output voltage at the first node and output a second output voltage at the third node, according to the duty cycle of the primary side circuit. The detecting circuit includes a main resistor, an auxiliary resistor, and an eighth capacitor. The main resistor is connected in series with the auxiliary resistor, the eighth capacitor is connected in parallel with the main resistor and the auxiliary resistor that are connected in series. The eighth capacitor and the auxiliary resistor are coupled to an induction contact. The second node is coupled between the main resistor and the auxiliary resistor. The load-dependent circuit is coupled to the induction contact and configured to control an electrical strength between the first node and the second node according to the first output voltage. The feedback circuit is coupled to the induction contact and configured to provide the feedback signal to the primary side circuit according to a detection signal. The power converter for an LED lighting device may automatically adapt to a corresponding electrical strength depending on different LED lighting devices. Therefore, a probability that errors may be caused by manual adjustment of currents is reduced, and the efficiency of mounting the LED lighting devices is improved.

In some embodiments, when the first output voltage is higher than a first threshold, the electrical strength is a first current, and the first current corresponds to a first voltage outputted by the load-dependent circuit. When the first output voltage is lower than the first threshold, the electrical strength is a second current, and the second current corresponds to a second voltage outputted by the load-dependent circuit. The first current is less than the second current.

In some embodiments, the load-dependent circuit includes a voltage stabilizing circuit, a load detection circuit, an adjustment circuit, and a limiting circuit. The voltage stabilizing circuit is configured to output a stabilizing voltage according to the second output voltage. The load detection circuit is configured to output a load signal according to the first output voltage. The adjustment circuit is configured to output the first voltage or the second voltage according to the load signal. The limiting circuit is coupled between the induction contact and the adjustment circuit and configured to adjust the first voltage or second voltage and output the adjusted first voltage or second voltage to the induction contact.

In some embodiments, the voltage stabilizing circuit includes a first resistor, a first voltage stabilizing element, and a first switch element. The first resistor is connected in parallel with the first switch element, one end of the first resistor and one end of the first switch element are coupled to the third node, and an other end of the first resistor is coupled to a cathode of the first voltage stabilizing element and a base of the first switch element.

In some embodiments, the load detection circuit includes a second resistor, a third resistor, a fifth resistor, a second comparison element, and a sixth resistor. One end of the second resistor is coupled to the voltage stabilizing circuit by using the first contact, and a second contact is disposed on an other end of the second resistor. One end of the third resistor is coupled in series with the second contact. One end of the fifth resistor is coupled to the first node and configured to receive the first output voltage, and a third contact is disposed on an other end of the fifth resistor. An input terminal of the second comparison element is coupled to the third contact, and a cathode of the second comparison element is coupled to the second contact. One end of the sixth resistor is coupled in series with the third contact, and an other end of the sixth resistor is coupled to an anode of the second comparison element and an other end of the third resistor.

In some embodiments, the adjustment circuit includes a second switch element, a fourth resistor, a seventh resistor, and an eighth resistor. One end of the second switch element is coupled to the second contact. The second switch element is switched to be turned on or off according to the load signal. When the second switch element is turned on, the adjustment circuit is configured to output the second voltage. When the second switch element is turned off, the adjustment circuit is configured to output the first voltage. The fourth resistor is coupled between an other end of the second switch element and a fourth contact. The seventh resistor is coupled between the first contact and the fourth contact. The limiting circuit is coupled to the fourth contact. The eighth resistor is coupled to the fourth contact. The first voltage is greater than the second voltage.

In some embodiments, when the first output voltage is higher than the first threshold, the electrical strength is the first current. The first current corresponds to the first voltage. When the first output voltage is lower than the first threshold and higher than the second threshold, the electrical strength is the second current. The second current corresponds to the second voltage. When the first output voltage is lower than the second threshold, the electrical strength is the third current. The third current corresponds to the third voltage.

The first current is less than the second current, and the second current is less than the third current.

In some embodiments, the load-dependent circuit includes the voltage stabilizing circuit, a first load detection circuit, a second load detection circuit, an adjustment circuit, and a limiting circuit. The voltage stabilizing circuit is configured to correspondingly output a stabilizing voltage according to a second output voltage. The first load detection circuit is configured to output a first load signal according to a first output voltage. The second load detection circuit is configured to output a second load signal according to the first output voltage. The adjustment circuit is configured to control the electrical strength according to the first load signal, the second load signal, and the stabilizing voltage. The limiting circuit is coupled between the induction contact and the adjustment circuit and configured to adjust the received first voltage, second voltage, or third voltage and output the adjusted first voltage, second voltage, or third voltage to the induction contact.

In some embodiments, the voltage stabilizing circuit includes a first resistor, a first voltage stabilizing element, and a first switch element. The first resistor is connected in parallel with the first switch element, one end of the first resistor and one end of the first switch element are coupled to the third node, and an other end of the first resistor is coupled to a cathode of the first voltage stabilizing element and a base of the first switch element.

In some embodiments, the first load detection circuit includes a second resistor, a third resistor, a fifth resistor, a sixth resistor, and a second comparison element. One end of the second resistor is coupled to the voltage stabilizing circuit by using the first contact, and a second contact is disposed on an other end of the second resistor. One end of the third resistor is coupled in series with the second contact. One end of the fifth resistor is coupled to the first node and configured to receive the first output voltage, and a third contact is disposed on an other end of the fifth resistor. An input terminal of the second comparison element is coupled to the third contact, and a cathode of the second comparison element is coupled to the second contact. One end of the sixth resistor is coupled in series with the third contact, and an other end of the sixth resistor is coupled to an anode of the second comparison element and an other end of the third resistor.

In some embodiments, the second load detection circuit includes a twelfth resistor, a thirteenth resistor, a fifteenth resistor, a twelfth comparison element, and a sixteenth resistor. One end of the twelfth resistor is coupled to the first contact, and a twelfth contact is disposed on an other end of the twelfth resistor. One end of the thirteenth resistor is coupled in series with the twelfth contact. One end of the fifteenth resistor is coupled to the first node and configured to receive the first output voltage, and a thirteenth contact is disposed on an other end of the fifteenth resistor. An input terminal of the twelfth comparison element is coupled to the thirteenth contact, and a cathode of the twelfth comparison element is coupled to the twelfth contact. One end of the sixteenth resistor is coupled in series with the thirteenth contact, and an other end of the sixteenth resistor is coupled to an anode of the twelfth comparison element and an other end of the thirteenth resistor.

In some embodiments, the adjustment circuit includes a second switch element, a fourth resistor, a twelfth switch element, a fourteenth resistor, a seventh resistor, and an eighth resistor. One end of the second switch element is coupled to the second contact, and the second switch element is switched to be turned on or off according to the first load signal. The fourth resistor is coupled between an other end of the second switch element and a fourth contact. One end of the twelfth switch element is coupled to the twelfth contact, and the twelfth switch element is switched between on and off according to the second load signal. The fourteenth resistor is coupled between an other end of the twelfth switch element and the fourth contact. The seventh resistor is coupled between the first contact and the fourth contact. The limiting circuit is coupled to the fourth contact. The eighth resistor is coupled to the fourth contact.

In some embodiments, if the second switch element and the twelfth switch element are both turned on, the adjustment circuit outputs the third voltage. If the second switch element is turned on and the twelfth switch element is turned off, the adjustment circuit outputs the second voltage. If the second switch element and the twelfth switch element are both turned off, the adjustment circuit outputs the first voltage. The first voltage is greater than the second voltage, and the second voltage is greater than the third voltage.

In some embodiments, the power converter for an LED lighting device may automatically adapt to a corresponding electrical strength depending on different LED lighting devices. In this way, a user does not need to manually adjust the current of the LED lighting devices. Therefore, a probability that errors may occur during adjustment can be reduced, and the efficiency of mounting the LED lighting devices can be improved.

DETAILED DESCRIPTION

Figure 1:
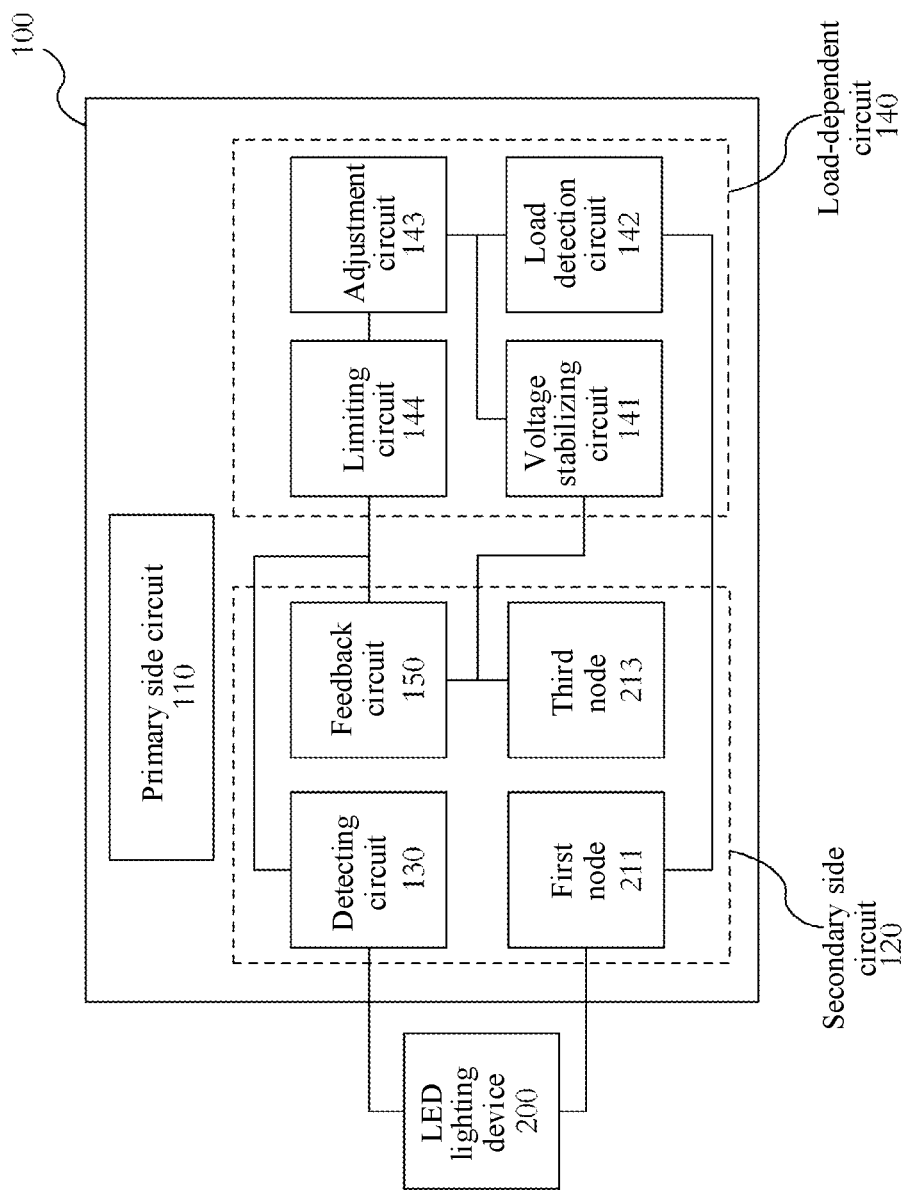
FIG. 1 is a schematic diagram of an architecture of a power converter for an LED lighting device according to an embodiment.

FIG. 1 and FIG. 2A to FIG. 2D are respectively a schematic diagram of an architecture of a power converter for an LED lighting device and schematic diagrams of details of circuits according to an embodiment. A power converter 100 includes a primary side circuit 110, a secondary side circuit 120, a detecting circuit 130, a load-dependent circuit 140, and a feedback circuit 150. The power converter 100 is coupled to an LED lighting device 200. The LED lighting device 200 includes at least one LED (unlabeled). The LED lighting device 200 has corresponding voltages depending on different quantities of LEDs. Thus, the power converter 100 is configured to output voltage and current corresponding to the LED's quantity of the connected LED lighting device 200.

The feedback circuit 150 provides a feedback signal to the primary side circuit 110 according to a detection signal, so as to adjust a duty cycle of the primary side circuit 110. The duty cycle refers to a ratio of the switch on duration to a total time of switch on and off in a cycle for which a third switch element 112 of the primary side circuit 110. If the power converter 100 is equipped with the LED lighting devices 200 of different voltage specifications each time, the power converter 100 can be automatically adjusted to the corresponding duty cycle, so as to output a working current in conformity with the currently mounted LED lighting device 200.

Figure 2A:
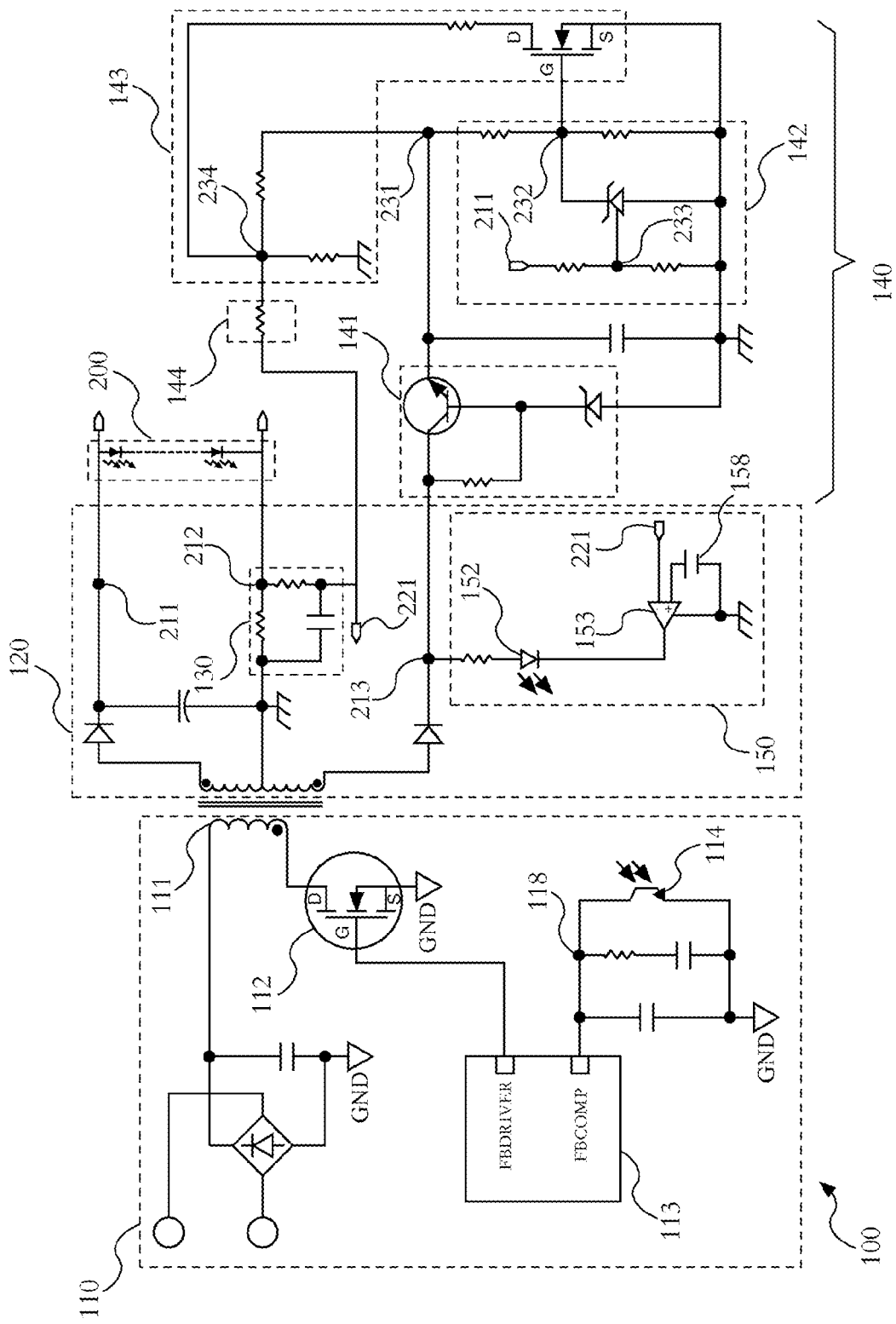
FIG. 2A is a schematic diagram of circuits of a power converter for an LED lighting device according to an embodiment.
Figure 2B:
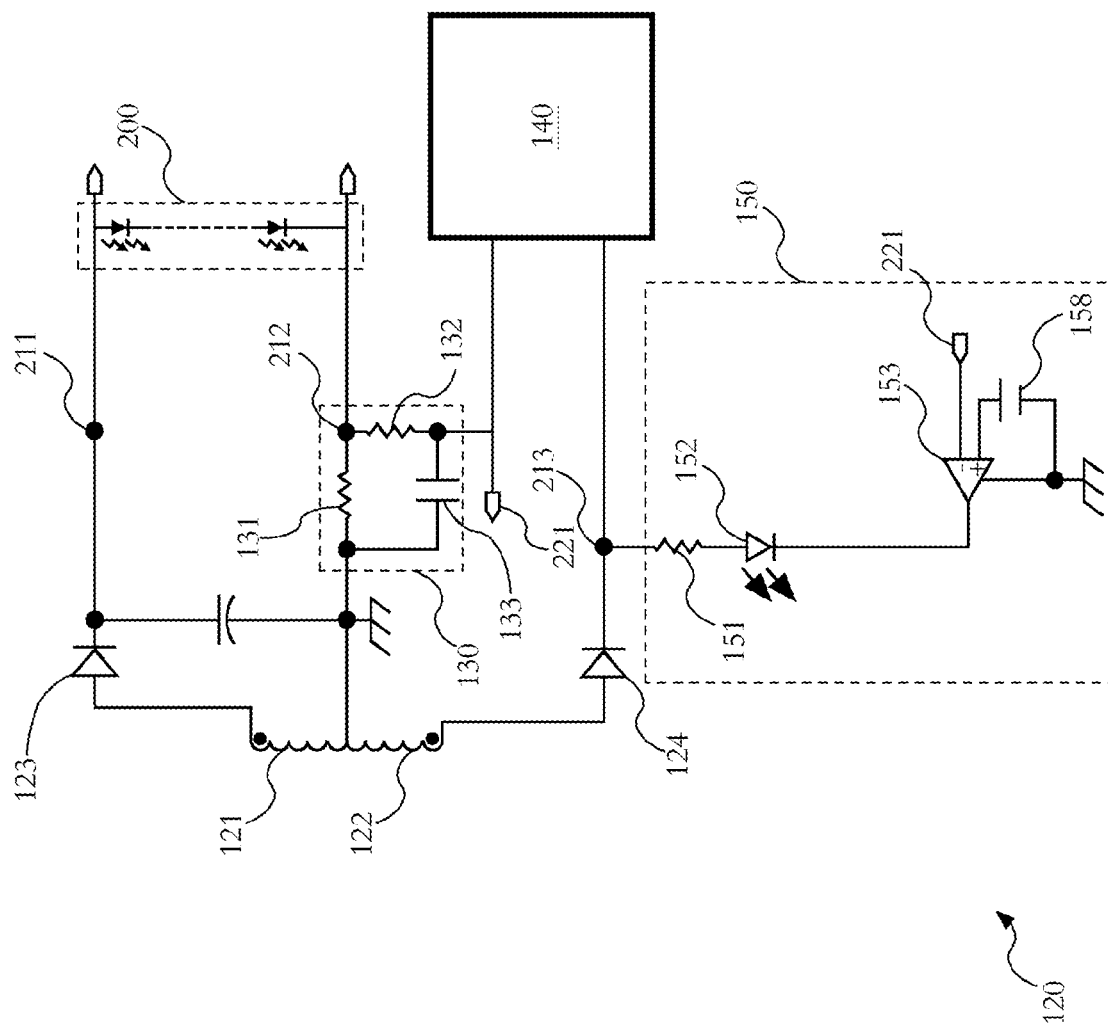
FIG. 2B is a schematic diagram of a secondary side circuit, a detecting circuit, and a feedback circuit according to an embodiment.

The secondary side circuit 120 includes a first winding 121, a second winding 122, a first diode 123, a second diode 124, the detecting circuit 130, and the feedback circuit 150, as shown in FIG. 2A and FIG. 2B. Two ends of the first winding 121 are respectively coupled to a first node 211 and a second node 212. The first node 211 and the second node 212 are respectively coupled to two ends of the LED lighting device 200. One end of the second winding 122 is coupled to a third node 213. The first node 211 outputs a first output voltage. The third node 213 outputs a second output voltage.

The detecting circuit 130 includes a main resistor 131, an auxiliary resistor 132, and an eighth capacitor 133, as shown in FIG. 2A and FIG. 2B. The main resistor 131 is connected in serial with the auxiliary resistor 132, and the second node 212 is coupled between the main resistor 131 and the auxiliary resistor 132. The eighth capacitor 133 is connected in parallel with the main resistor 131 and the auxiliary resistor 132 that are connected in series with each other. The eighth capacitor 133 and the auxiliary resistor 132 are coupled to an induction contact 221. The induction contact 221 is coupled to the load-dependent circuit 140 and the feedback circuit 150. The detecting circuit 130 is configured to receive a first voltage or a second voltage outputted by the load-dependent circuit 140 and an electrical strength of the LED lighting device 200, so as to generate a detection signal.

The load-dependent circuit 140 is coupled to the induction contact 221, the first node 211, and the third node 213. The load-dependent circuit 140 correspondingly controls an electrical strength between the first node 211 and the second node 212 according to the first output voltage. The electrical strength is a current passing through the first node 211 to the second node 212. When the first output voltage is higher than a first threshold, the electrical strength is a first current. When the first output voltage is lower than the first threshold, the electrical strength is a second current. The first current corresponds to a first voltage outputted by the load-dependent circuit 140, and the second current corresponds to a second voltage outputted by the load-dependent circuit 140. The first current is less than the second current. Therefore, the first voltage is greater than the second voltage.

Figure 2C:
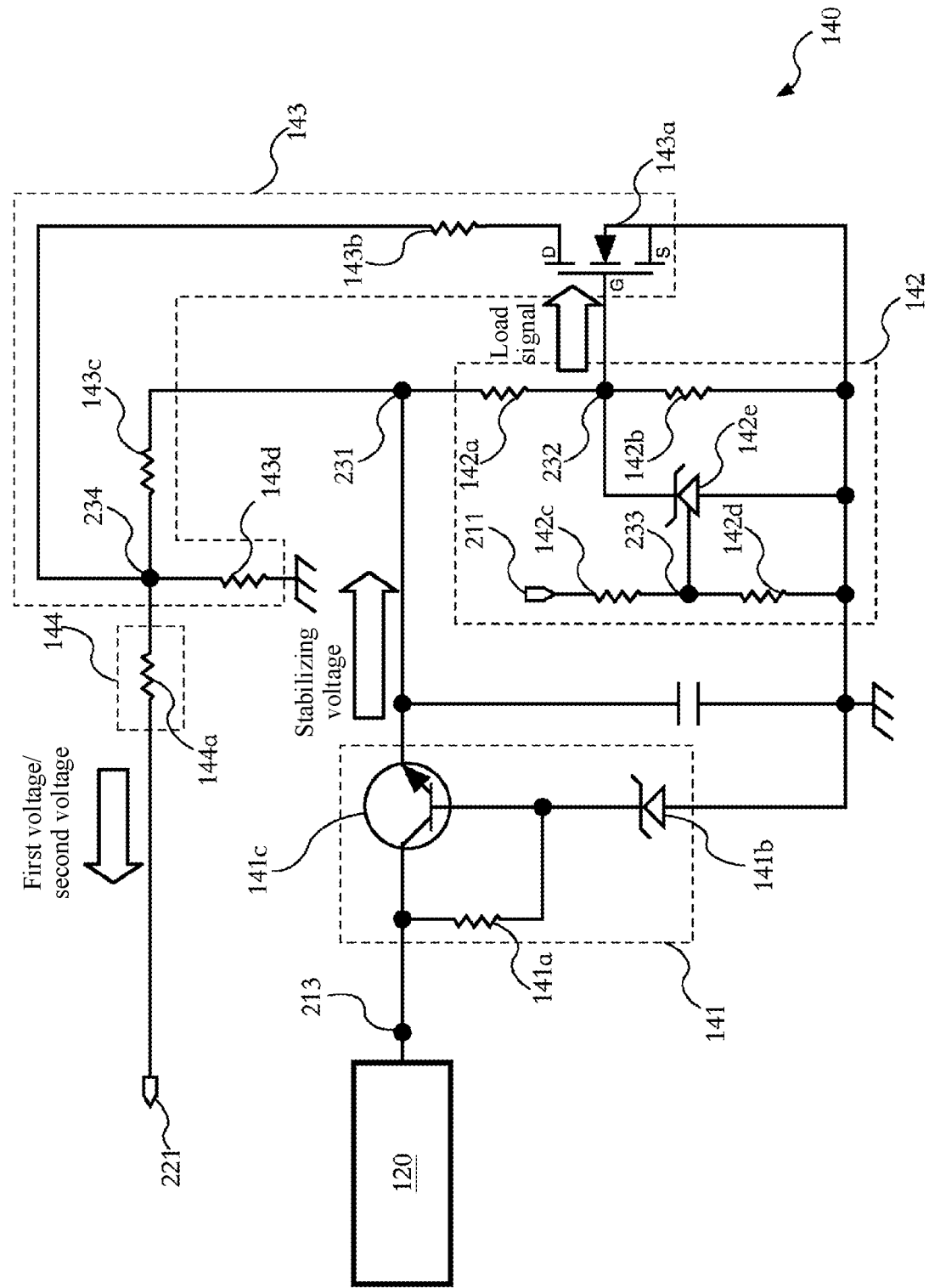
FIG. 2C is a schematic diagram of a load-dependent circuit according to an embodiment.

The load-dependent circuit 140 includes a voltage stabilizing circuit 141, a load detection circuit 142, an adjustment circuit 143, and a limiting circuit 144, as shown in FIG. 2A and FIG. 2C. The voltage stabilizing circuit 141 is configured to correspondingly output a stabilizing voltage according to the second output voltage. The voltage stabilizing circuit 141 includes a first resistor 141a, a first voltage stabilizing element 141b, and a first switch element 141c, as shown in FIG. 2C. The first resistor 141a is connected in parallel with the first switch element 141c. One end of the first resistor 141a and one end of the first switch element 141c are coupled to the third node 213 of the second winding 122. An other end of the first resistor 141a is coupled to a cathode of the first voltage stabilizing element 141b and a base of the first switch element 141c. The first voltage stabilizing element 141b may be a Zener diode or other electronic elements having a voltage-stabilizing capacity. The first switch element 141c is a transistor. In FIG. 2A of this embodiment, an NPN-type transistor is used as the first switch element 141c by way of example. A first contact 231 is disposed on an emitter pin of the first switch element 141c. The first switch element 141c is configured to determine a passed stabilizing voltage according to the second output voltage. The cathode of the first voltage stabilizing element 141b is coupled to the base of the first switch element 141c, and an anode of the first voltage stabilizing element 141b is coupled to the load detection circuit 142.

The load detection circuit 142 is configured to output a load signal according to the first output voltage. The load detection circuit 142 includes a second resistor 142a, a third resistor 142b, a fifth resistor 142c, a sixth resistor 142d, and a second comparison element 142e. One end of the second resistor 142a is coupled to the first contact 231, and a second contact 232 is disposed on an other end of the second resistor 142a.

One end of the third resistor 142b is coupled to the second contact 232 and a cathode of the second comparison element 142e. One end of the fifth resistor 142c is coupled to the first node 211 and configured to receive the first output voltage. A third contact 233 is disposed on an other end of the fifth resistor 142c. One end of the sixth resistor 142d is coupled to the third contact 233 and an input terminal of the second comparison element 142e, and an other end of the sixth resistor 142d is coupled to an anode of the second comparison element 142e and an other end of the third resistor 142b. The second comparison element 142e is configured to determine, by means of voltage division by using the fifth resistor 142c and the sixth resistor 142d, whether the anode and the cathode of the second comparison element 142e are turned on, so as to output the corresponding load signal.

The adjustment circuit 143 includes a second switch element 143a, a fourth resistor 143b, a seventh resistor 143c, and an eighth resistor 143d, as shown in FIG. 2C. A gate terminal of the second switch element 143a is coupled to the second contact 232. In this embodiment, an N-channel field-effect transistor is used as the second switch element 143a. A drain terminal of the second switch element 143a is coupled to one end of the fourth resistor 143b. A source terminal of the second switch element 143a is coupled to the anode of the second comparison element 142e. It is determined, depending on load signals of different logic levels, whether the second switch element 143a is in a turn-on state or turn-off state. When the second switch element 143a is in the turn-off state, the adjustment circuit 143 outputs a first voltage.

When the second switch element 143a is in the turn-on state, the adjustment circuit 143 outputs a second voltage. One end of the fourth resistor 143b is coupled to the drain terminal of the second switch element 143a, and a fourth contact 234 is disposed on an other end of the fourth resistor 143b. One end of the seventh resistor 143c is coupled to the first contact 231, and an other end of the seventh resistor 143c is coupled to the fourth contact 234. One end of the eighth resistor 143d is coupled to the fourth contact 234. The limiting circuit 144 is coupled between the induction contact 221 and the adjustment circuit 143 (the fourth contact 234).

In an embodiment, the limiting circuit 144 is composed of a ninth resistor 144a. The limiting circuit 144 adjusts the received first voltage or second voltage, and outputs the adjusted first voltage or second voltage to the induction contact 221.

In some embodiments, taking two sets of LED lighting devices 200 as an example, the two sets of LED lighting devices 200 have respective electrical strengths. When the first output voltage is higher than the first threshold, the electrical strength is a first current. When the first output voltage is lower than the first threshold, the electrical strength is a second current. The first current is less than the second current, and the first voltage is greater than the second voltage. The first threshold is determined depending on the types and quantities of the connected LED lighting devices 200.

Figure 2D:
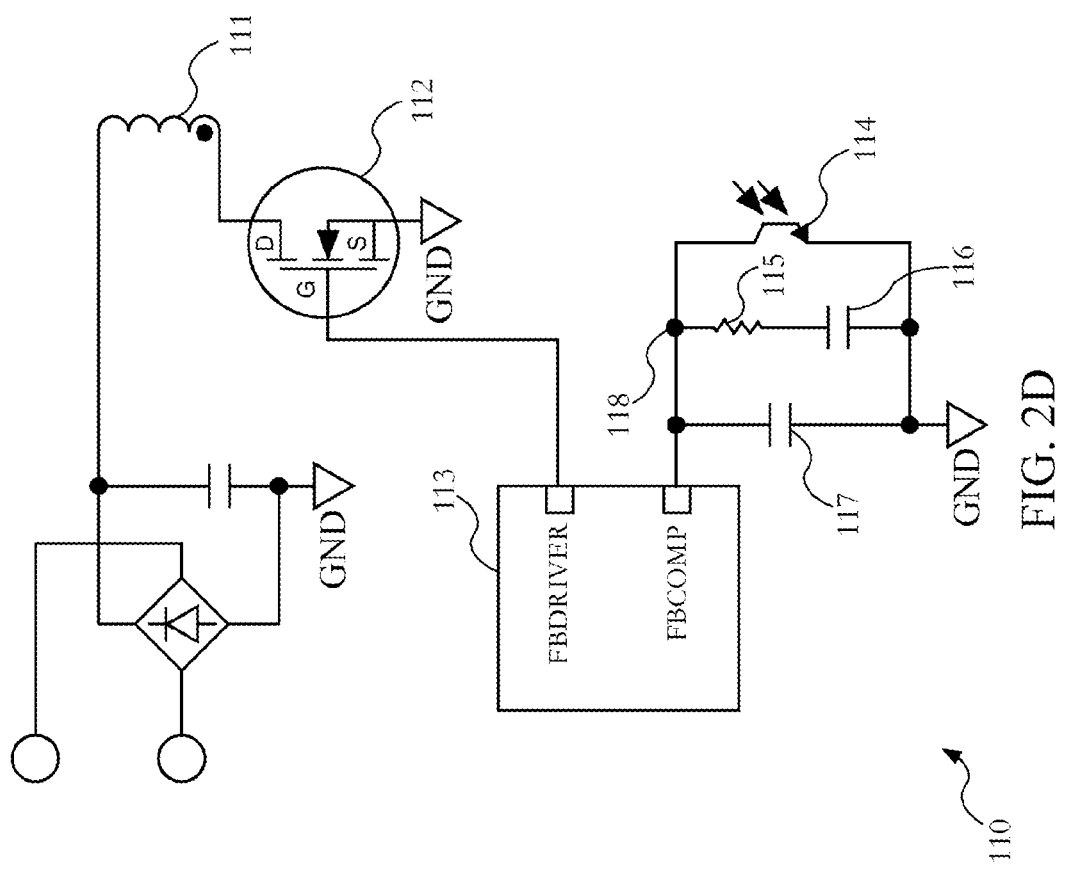
FIG. 2D is a schematic diagram of a primary side circuit according to an embodiment.

The primary side circuit 110 includes a third winding 111, a third switch element 112, a control element 113, a first photosensor 114, a first side resistor 115, a second capacitor 116, and a third capacitor 117, as shown in FIG. 2D. One end of the third winding 111 is coupled to a direct-current power supply terminal, and an other end of the third winding 111 is coupled to a drain terminal of the third switch element 112. The control element 113 has a driving pin (FB-DRIVER) and a compensation pin (FBCOMP). A gate terminal of the third switch element 112 is coupled to the driving pin of the control element 113.

An input node 118 is disposed on one end of the first side resistor 115, and an other end of the first side resistor 115 is coupled in serial with one end of the second capacitor 116. One end of the third capacitor 117 is coupled to the input node 118, and an other end of the third capacitor 117 is coupled to an other end of the second capacitor 116. The third capacitor 117 is connected in parallel with a series structure of the first side resistor 115 and the second capacitor 116. The first photosensor 114 is connected in parallel with the series structure of the first side resistor 115 and the second capacitor 116. The compensation pin (FBCOMP) of the control element 113 is coupled to the input node 118. The first photosensor 114 drives the control element 113 according to a change in the feedback signal, and the control element 113 is configured to control turn-on and turn-off operations of the third switch element 112 in a corresponding duty cycle.

The feedback circuit 150 includes a first feedback resistor 151, a second photosensor 152, and a third comparison unit 153, as shown in FIG. 2A and FIG. 2B. One end of the first feedback resistor 151 is coupled to the third node 213, and an other end of the first feedback resistor 151 is coupled in series with one end of the second photosensor 152. An other end of the second photosensor 152 is connected to an output terminal of the third comparison unit 153. An inverting input terminal of the third comparison unit 153 is coupled to the induction contact 221, and a non-inverting input terminal of the third comparison unit 153 receives a reference voltage 158.

The third comparison unit 153 controls the second photosensor 152 according to the reference voltage 158 and the first voltage or the second voltage received by the induction contact 221, so that the second photosensor 152 controls the first photosensor 114 by using different brightness, thereby adjusting the control element 113. The control element 113 controls turn-on and turn-off operations of the third switch element 112 in a corresponding duty cycle. Generally, the third comparison unit 153 is an operational amplifier, and has a steady state and a transient state. For ease of description and understanding, the third comparison unit 153 is generally virtually grounded when in the steady state. In this case, a voltage of the non-inverting input terminal of the third comparison unit 153 may be deemed to be consistent with a voltage of the inverting input terminal, so that a voltage of the induction contact 221 is similar to the reference voltage 158 of the non-inverting input terminal. When the third comparison unit 153 is in the transient state, a current accordingly generated by the first voltage or the second voltage outputted by the load-dependent circuit 140 and the electrical strength outputted by the LED lighting device 200 are adjusted relative to each other, so that the voltage of the induction contact 221 is similar to the reference voltage 158 when the third comparison unit enters the steady state.

For example, when the current accordingly generated by the first voltage or the second voltage outputted by the load-dependent circuit 140 is relatively large, the electrical strength outputted by the LED lighting device 200 is reduced accordingly. Conversely, the current accordingly generated by the first voltage or the second voltage outputted by the load-dependent circuit 140 is relatively small, the electrical strength outputted by the LED lighting device 200 is increased accordingly. When the detection signal on the inverting input terminal of the third comparison unit 153 is changed according to the duty cycle of the third switch element 112, the detection signal gradually approaches the reference voltage 158 of the non-inverting input terminal of the third comparison unit 153, so that an entire circuit of the power converter 100 enters the steady state.

When the power converter 100 is connected to different LED lighting devices 200, a voltage passing through the induction contact 221 is changed by means of the operation of the load-dependent circuit 140. The third comparison unit 153 determines, according to the detection signal and the reference voltage 158, whether an output level of the first output voltage rises or falls. If the output level of the first output voltage rises, the current passing through the second photosensor 152 rises. Under the effect of optical coupling of the first photosensor 114 and the second photosensor 152, the control element 113 shortens the duty cycle of the third switch element 112. Therefore, the current passing through the LED lighting device 200 also falls. Otherwise, if the output level of the first output voltage falls, the control element 113 prolongs the duty cycle of the third switch element 112, so that the current passing through the LED lighting device 200 rises.

In order to further describe the operations for different LED lighting devices 200 in this embodiment, a first LED device (unlabeled) and a second LED device (unlabeled) are used for description. However, the electrical strengths of the LED devices in the example are not limited herein. It is assumed that a working voltage of the first LED device is in a range of 40-50 volts (V), a working current of the first LED device is 0.4 amperes (A), a working voltage of the second LED device is in a range of 30-39 V, and a working current of the second LED device is 0.5 A.

First, the first LED device is disposed between the first node 211 and the second node 212. The load detection circuit 142 receives the first output voltage from the first node 211. The voltage stabilizing circuit 141 receives the second output voltage from the third node 213. The load detection circuit 142 transmits the corresponding load signal to the adjustment circuit 143. The voltage stabilizing circuit 141 drives the first switch element 141c to adjust the flowing voltage according to the second output voltage, so as to output a stabilizing voltage.

Figure 3:
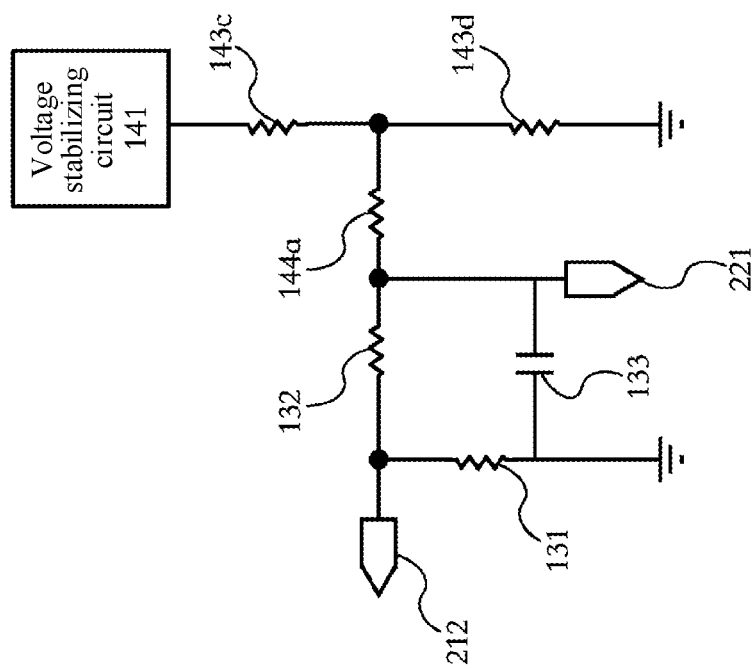
FIG. 3 is a schematic diagram of an equivalent circuit connected to a first LED device according to an embodiment.

FIG. 3 is a schematic diagram of an equivalent circuit connected to a first LED device according to an embodiment. When the second switch element 143a of the adjustment circuit 143 is turned off according to the received load signal at a low logic level, the stabilizing voltage outputs a first voltage after being divided by using the seventh resistor 143c and the eighth resistor 143d. Since the second switch element 143a is turned off, the fourth resistor 143b and the eighth resistor 143d are not connected in parallel. Therefore, a voltage across the eighth resistor 143d is larger than a voltage across the fourth resistor 143b and the eighth resistor 143d when being connected in parallel. Since the voltage across the eighth resistor 143d is relatively large, a voltage of the eighth capacitor 133 is relatively increased, so that the detection signal of the induction contact 221 is changed by the transient boost of the eighth capacitor 133. The third comparison unit 153 outputs a corresponding signal according to the change (greater than the reference voltage 158) of the detection signal, so that the current passing through the second photosensor 152 rises. Under the effect of optical coupling of the first photosensor 114 and the second photosensor 152, the control element 113 shortens the duty cycle of the third switch element 112. In this way, when the first current (corresponding to the first voltage) flowing from the first LED device flows through the main resistor 131, a voltage across the main resistor 131 is relatively low to conform to the reference voltage 158 on the non-inverting input terminal of the third comparison unit 153.

Figure 4:
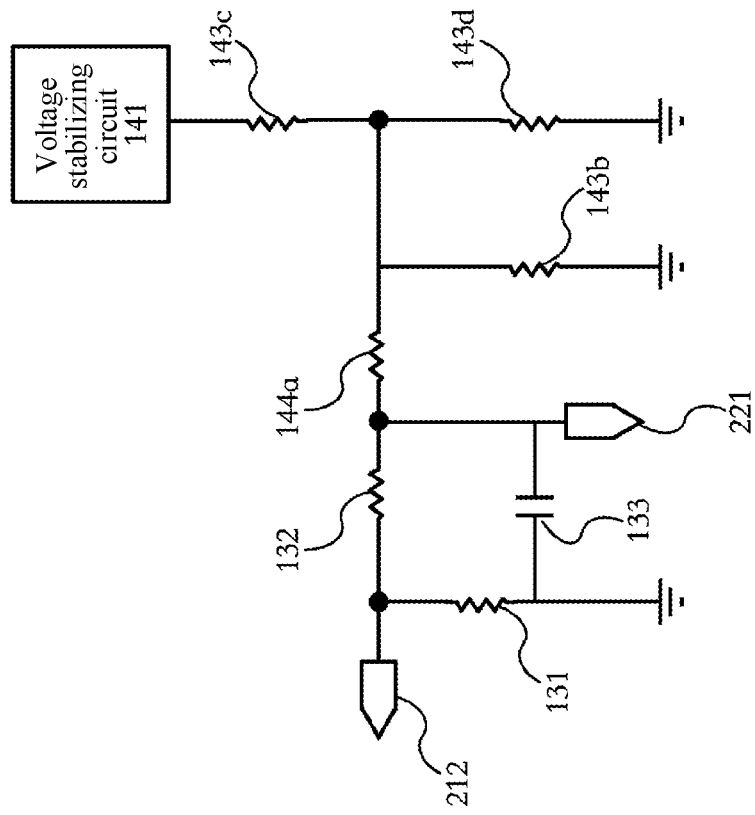
FIG. 4 is a schematic diagram of an equivalent circuit connected to a second LED device according to an embodiment.

FIG. 4 is a schematic diagram of an equivalent circuit connected to a second LED device according to an embodiment. When the second switch element 143a of the adjustment circuit 143 is turned on according to the received load signal at a high logic level, the eighth resistor 143d and the fourth resistor 143b form a parallel structure, and the stabilizing voltage outputs the second voltage after being divided by using the seventh resistor 143c and the foregoing parallel structure. Since the second switch element 143a is turned on, the voltage across the foregoing parallel structure is smaller than the voltage across the eighth resistor and the fourth resistor that are not connected in parallel. Therefore, the voltage passing through the eighth capacitor 133 may also be relatively reduced, and the detection signal of the induction contact 221 may be changed by the instantaneous voltage drop of the eighth capacitor 133. The third comparison unit 153 outputs a corresponding signal according to the change (less than the reference voltage 158) of the detection signal, so that the current passing through the second photosensor 152 falls. Under the effect of optical coupling of the first photosensor 114 and the second photosensor 152, the control element 113 prolongs the duty cycle of the third switch element 112. In this way, when the second current flowing from the second LED device flows through the main resistor 131, the voltage across the main resistor 131 is relatively high to conform to the reference voltage 158 on the non-inverting input terminal of the third comparison unit 153.

Figure 5:
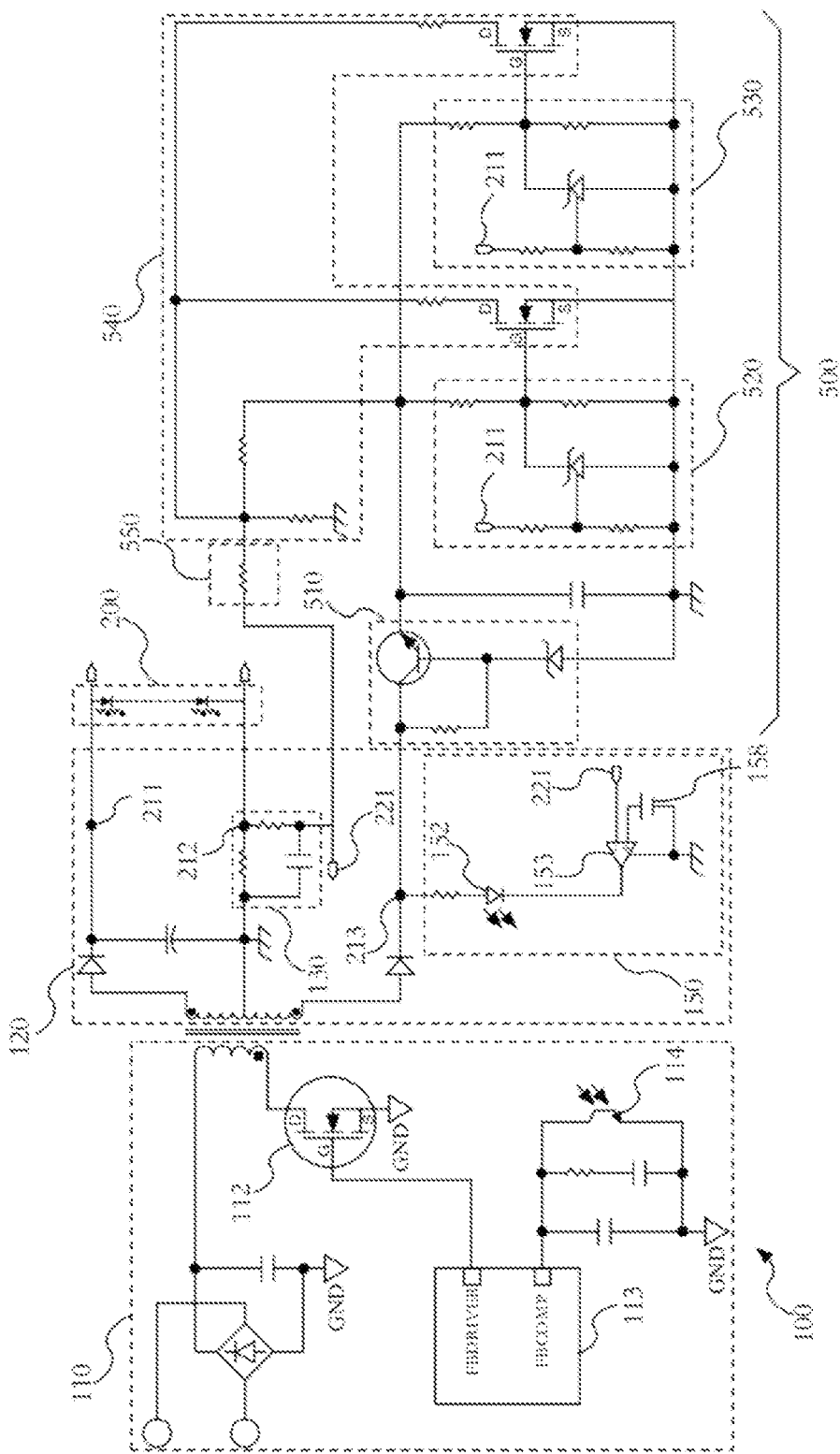
FIG. 5 is a schematic diagram of circuits of a power converter for an LED lighting device according to an embodiment.
Figure 6:
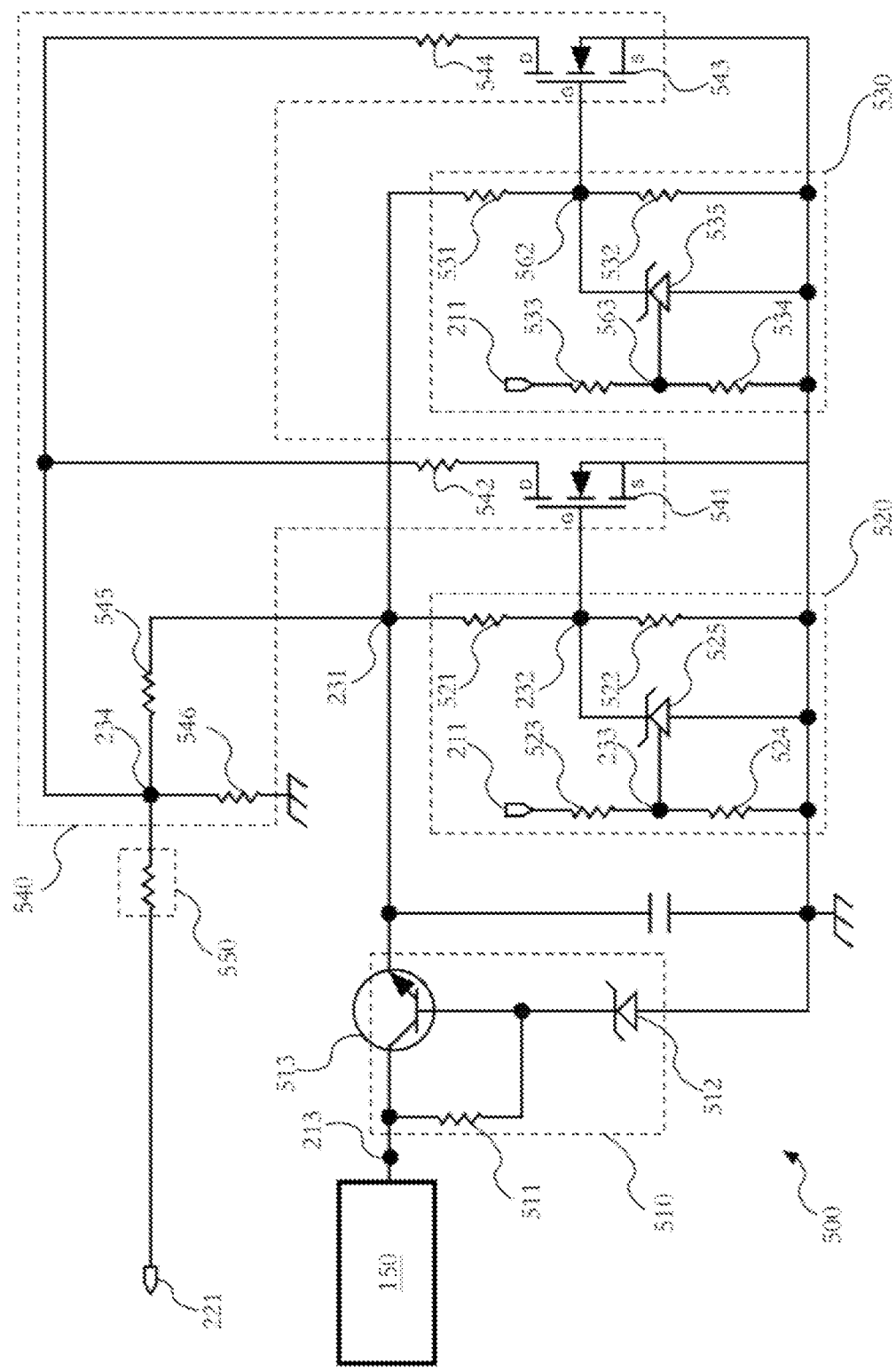
FIG. 6 is a schematic diagram of a load-dependent circuit according to an embodiment.

In some embodiments, the power converter 100 includes a primary side circuit 110, a secondary side circuit 120, a detecting circuit 130, a load-dependent circuit 500, and a feedback circuit 150, as shown in FIG. 5 and FIG. 6. Structures and connection modes of the primary side circuit 110, the secondary side circuit 120, the detecting circuit 130, and the feedback circuit 150 are the same as that in the previous embodiment. Therefore, details are not repeatedly described. Reference may be made to FIG. 2A and related descriptions.

In this embodiment, the load-dependent circuit 500 includes a voltage stabilizing circuit 510, a first load detection circuit 520, a second load detection circuit 530, an adjustment circuit 540, and a limiting circuit 550. The voltage stabilizing circuit 510 is configured to correspondingly output a stabilizing voltage according to the second output voltage. The voltage stabilizing circuit 510 includes a first resistor 511, a first voltage stabilizing element 512, and a first switch element 513, as shown in FIG. 6. The first resistor 511 is connected in parallel with the first switch element 513. One end of the first resistor 511 is coupled to one end of the first switch element 513 and the third node 213, and an other end of the first resistor 511 is coupled to an other end (that is, a base terminal) of the first switch element 513.

One end of the first voltage stabilizing element 512 is coupled to the first resistor 511 and a base of the first switch element 513, and an other end of the first voltage stabilizing element 512 is coupled to a sixth resistor 524 of the first load detection circuit 520. The first voltage stabilizing element 512 may be a Zener diode, or other electronic elements having a voltage-stabilizing capacity. The first switch element 513 is a transistor. In this embodiment, an NPN-type transistor is used as the first switch element 513 by way of example. A first contact 231 is disposed on an emitter pin of the first switch element 513. The first switch element 513 is configured to determine a passed stabilizing voltage according to the second output voltage.

The first load detection circuit 520 includes a second resistor 521, a third resistor 522, a fifth resistor 523, a sixth resistor 524, and a second comparison element 525. One end of the second resistor 521 is coupled to the first contact 231, and a second contact 232 is disposed on an other end of the second resistor 521. One end of the third resistor 522 is coupled to the second contact 232 and a cathode of the second comparison element 525, and an other end of the third resistor 522 is coupled to an anode of the second comparison element 525.

One end of the fifth resistor 523 is coupled to the first node 211 and receives the first output voltage. A third contact 233 is disposed on an other end of the fifth resistor 523. One end of the sixth resistor 524 is coupled to the third contact 233 and an input terminal of the second comparison element 525, and an other end of the sixth resistor 524 is coupled to the anode of the second comparison element 525. The cathode of the second comparison element 525 is coupled to the second contact 232. The first load detection circuit 520 is configured to determine, by means of voltage division by using the fifth resistor 523 and the sixth resistor 524, whether the anode and the cathode of the second comparison element 525 are turned on, and output a corresponding first load signal.

The second load detection circuit 530 includes a twelfth resistor 531, a thirteenth resistor 532, a fifteenth resistor 533, a sixteenth resistor 534, and a twelfth comparison element 535. One end of the twelfth resistor 531 is coupled to the first contact 231, and a twelfth contact 562 is disposed on an other end of the twelfth resistor 531. One end of the thirteenth resistor 532 is coupled to the twelfth contact 562 and a cathode of the twelfth comparison element 535, and an other end of the thirteenth resistor 532 is coupled to an anode of the twelfth comparison element 535.

One end of the fifteenth resistor 533 is coupled to the first node 211 and receives a first output voltage. A thirteenth contact 563 is disposed on an other end of the fifteenth resistor 533. One end of the sixteenth resistor 534 is coupled to the thirteenth contact 563 and an input terminal of the twelfth comparison element 535, and an other end of the sixteenth resistor 534 is coupled to the anode of the twelfth comparison element 535. The second load detection circuit 530 is configured to determine, by means of voltage division by using the fifteenth resistor 533 and the sixteenth resistor 534, whether the anode and the cathode of the twelfth comparison element 535 are turned on, and output a corresponding second load signal.

The adjustment circuit 540 includes a second switch element 541, a fourth resistor 542, a twelfth switch element 543, a fourteenth resistor 544, a seventh resistor 545, and an eighth resistor 546. A gate terminal of the second switch element 541 is coupled to the second contact 232. A drain terminal of the second switch element 541 is coupled to an end of the fourth resistor 542. A source terminal of the second switch element 541 is coupled to the anode of the second comparison element 525. The second switch element 541 is switched to be turned on or off according to the first load signal.

One end of the fourth resistor 542 is coupled to the drain terminal of the second switch element 541, and a fourth contact 234 is disposed on an other end of the fourth resistor 542. The seventh resistor 545 is coupled between the fourth contact 234 and the first contact 231. A gate terminal of the twelfth switch element 543 is coupled to the twelfth contact 562. The twelfth switch element 543 is switched to be turned on or off according to the second load signal.

One end of the eighth resistor 546 is coupled to the fourth contact 234. One end of the fourteenth resistor 544 is coupled to the drain terminal of the twelfth switch element 543, and an other end of the fourteenth resistor 544 is coupled to the fourth contact 234. The limiting circuit 550 is coupled between the induction contact 221 and the adjustment circuit 540 (the fourth contact 234). The limiting circuit 550 is configured to adjust the received first voltage, second voltage, or third voltage, and output the adjusted voltage to the induction contact 221. It is determined, respectively according to the first load signal and the second load signal, whether the second switch element 541 and the twelfth switch element 543 are turned on or off. By means of a design of values of resistance of a voltage dividing circuit composed of the fifth resistor 523 and the sixth resistor 524 and a voltage dividing circuit composed of the fifteenth resistor 533 and the sixteenth resistor 534, in the present invention, three different working voltages may be provided by means of a combination of the second switch element 541 and the twelfth switch element 543 that are turned on and turned off.

If three sets of LED lighting devices are used as an example, two sets of thresholds are used to distinguish the electrical strengths, which are respectively a first threshold and a second threshold. When the first output voltage is higher than the first threshold, the electrical strength is a first current, and the first current corresponds to a first voltage. When the first output voltage is lower than the first threshold and higher than the second threshold, the electrical strength is a second current, and the second current corresponds to a second voltage. When the first output voltage is lower than the second threshold, the electrical strength is a third current, and the third current corresponds to a third voltage.

If the second switch element 541 and the twelfth switch element 543 are both turned on, the adjustment circuit 540 outputs a third voltage. When the second switch element 541 is turned on and the twelfth switch element 543 is turned off, the adjustment circuit 540 outputs a second voltage. If the second switch element 541 and the twelfth switch element 543 are both turned off, the adjustment circuit 540 outputs the first voltage. The first voltage is greater than the second voltage, and the second voltage is greater than the third voltage. The first current is less than the second current, and the second current is less than the third current.

The power converter 100 for an LED lighting device may automatically adapt to a corresponding electrical strength depending on different LED lighting devices. In this way, a user does not need to manually adjust the current of the LED lighting devices. Therefore, a probability that errors may occur during adjustment can be reduced, and the efficiency of mounting the LED lighting devices can be improved.

What is claimed is:

1. A power converter for a light emitting diode (LED) lighting device, the power converter comprising:
   a primary side circuit, configured to adjust a duty cycle of the primary side circuit according to a feedback signal;
   a secondary side circuit, comprising a first winding and a second winding, wherein two ends of the first winding are respectively coupled to a first node and a second node, the second winding is coupled to a third node, and the secondary side circuit is configured to output a first output voltage at the first node and output a second output voltage at the third node, according to the duty cycle of the primary side circuit;
   a detecting circuit, comprising a main resistor, an auxiliary resistor, and an eighth capacitor, wherein the main resistor is connected in series with the auxiliary resistor, the eighth capacitor is connected in parallel with the main resistor and the auxiliary resistor that are connected in series, the eighth capacitor and the auxiliary resistor are coupled to an induction contact, and the second node is coupled between the main resistor and the auxiliary resistor;
   a load-dependent circuit, coupled to the induction contact and configured to control an electrical strength between the first node and the second node according to the first output voltage; and
   a feedback circuit, coupled to the induction contact and configured to provide the feedback signal to the primary side circuit according to a detection signal.

2. The power converter for an LED lighting device according to claim 1, wherein when the first output voltage is higher than a first threshold, the electrical strength is a first current, and the first current corresponds to a first voltage outputted by the load-dependent circuit; and when the first output voltage is lower than the first threshold, the electrical strength is a second current, and the second current corresponds to a second voltage outputted by the load-dependent circuit, wherein the first current is less than the second current.

3. The power converter for an LED lighting device according to claim 2, wherein the load-dependent circuit comprises:
   a voltage stabilizing circuit, configured to output a stabilizing voltage according to the second output voltage;
   a load detection circuit, configured to output a load signal according to the first output voltage;
   an adjustment circuit, configured to control the electrical strength according to the load signal and the stabilizing voltage; and
   a limiting circuit, coupled between the induction contact and the adjustment circuit and configured to adjust the first voltage or second voltage and output the adjusted first voltage or second voltage to the induction contact.

4. The power converter for an LED lighting device according to claim 3, wherein the voltage stabilizing circuit comprises:

a first resistor;
a first voltage stabilizing element; and
a first switch element, wherein the first resistor is connected in parallel with the first switch element, one end of the first resistor and one end of the first switch element are coupled to the third node, and an other end of the first resistor is coupled to a cathode of the first voltage stabilizing element and a base of the first switch element.

5. The power converter for an LED lighting device according to claim 4, wherein the load detection circuit comprises:
a second resistor, wherein one end of the second resistor is coupled to the voltage stabilizing circuit by using a first contact, and a second contact is disposed on an other end of the second resistor;
a third resistor, wherein one end of the third resistor is coupled in series with the second contact;
a fifth resistor, wherein one end of the fifth resistor is coupled to the first node and is configured to receive the first output voltage, and a third contact is disposed on an other end of the fifth resistor;
a second comparison element, wherein an input terminal of the second comparison element is coupled to the third contact, and a cathode of the second comparison element is coupled to the second contact; and
a sixth resistor, wherein one end of the sixth resistor is coupled in series with the third contact, and an other end of the sixth resistor is coupled to an anode of the second comparison element and an other end of the third resistor.

6. The power converter for an LED lighting device according to claim 5, wherein the adjustment circuit comprises:
a second switch element, wherein one end of the second switch element is coupled to the second contact, the second switch element is switched to be turned on or off according to the load signal, when the second switch element is turned on, the adjustment circuit is configured to output the second voltage, and when the second switch element is turned off, the adjustment circuit is configured to output the first voltage;
a fourth resistor, coupled between an other end of the second switch element and a fourth contact;
a seventh resistor, coupled between the first contact and the fourth contact, wherein the limiting circuit is coupled to the fourth contact; and
an eighth resistor, coupled to the fourth contact, wherein the first voltage is greater than the second voltage.

7. The power converter for an LED lighting device according to claim 1, wherein when the first output voltage is higher than a first threshold, the electrical strength is a first current, and the first current corresponds to a first voltage; when the first output voltage is lower than the first threshold and higher than a second threshold, the electrical strength is a second current, and the second current corresponds to a second voltage; and when the first output voltage is lower than the second threshold, the electrical strength is a third current, and the third current corresponds to a third voltage, wherein the first current is less than the second current, and the second current is less than the third current.

8. The power converter for an LED lighting device according to claim 7, wherein the load-dependent circuit comprises:
a voltage stabilizing circuit, configured to correspondingly output a stabilizing voltage according to the second output voltage;
a first load detection circuit, configured to output a first load signal according to the first output voltage;
a second load detection circuit, configured to output a second load signal according to the first output voltage;
an adjustment circuit, configured to control the electrical strength according to the first load signal, the second load signal, and the stabilizing voltage; and
a limiting circuit, coupled between the induction contact and the adjustment circuit and configured to adjust the first voltage, second voltage, or third voltage and output the adjusted first voltage, second voltage, or third voltage to the induction contact.

9. The power converter for an LED lighting device according to claim 8, wherein the voltage stabilizing circuit comprises:
a first resistor;
a first voltage stabilizing element; and
a first switch element, wherein the first resistor is connected in parallel with the first switch element, one end of the first resistor and one end of the first switch element are coupled to the third node, and an other end of the first resistor is coupled to a cathode of the first voltage stabilizing element and a base of the first switch element.

10. The power converter for an LED lighting device according to claim 9, wherein the first load detection circuit comprises:
a second resistor, wherein one end of the second resistor is coupled to the voltage stabilizing circuit by using a first contact, and a second contact is disposed on an other end of the second resistor;
a third resistor, wherein one end of the third resistor is coupled in series with the second contact;
a fifth resistor, wherein one end of the fifth resistor is coupled to the first node and is configured to receive the first output voltage, and a third contact is disposed on an other end of the fifth resistor;
a second comparison element, wherein an input terminal of the second comparison element is coupled to the third contact, and a cathode of the second comparison element is coupled to the second contact; and
a sixth resistor, wherein one end of the sixth resistor is coupled in series with the third contact, and an other end of the sixth resistor is coupled to an anode of the second comparison element and an other end of the third resistor.

11. The power converter for an LED lighting device according to claim 10, wherein the second load detection circuit comprises:
a twelfth resistor, wherein one end of the twelfth resistor is coupled to the first contact, and a twelfth contact is disposed on an other end of the twelfth resistor;
a thirteenth resistor, wherein one end of the thirteenth resistor is coupled in series with the twelfth contact;
a fifteenth resistor, wherein one end of the fifteenth resistor is coupled to the first node and is configured to receive the first output voltage, and a thirteenth contact is disposed on an other end of the fifteenth resistor;
a twelfth comparison element, wherein an input terminal of the twelfth comparison element is coupled to the thirteenth contact, and a cathode of the twelfth comparison element is coupled to the twelfth contact; and
a sixteenth resistor, wherein one end of the sixteenth resistor is coupled in series with the thirteenth contact, and an other end of the sixteenth resistor is coupled to an anode of the twelfth comparison element and an other end of the thirteenth resistor.

12. The power converter for an LED lighting device according to claim 11, wherein the adjustment circuit comprises:
- a second switch element, wherein one end of the second switch element is coupled to the second contact, and the second switch element is switched to be turned on or off according to the first load signal;
- a fourth resistor, coupled between an other end of the second switch element and a fourth contact;
- a twelfth switch element, wherein one end of the twelfth switch element is coupled to the twelfth contact, and the twelfth switch element is switched to be turned on or off according to the second load signal;
- a fourteenth resistor, coupled between an other end of the twelfth switch element and the fourth contact;
- a seventh resistor, coupled between the first contact and the fourth contact, wherein the limiting circuit is coupled to the fourth contact; and
- an eighth resistor, coupled to the fourth contact.

13. The power converter for an LED lighting device according to claim 12, wherein when the second switch element and the twelfth switch element are both turned on, the adjustment circuit is configured to output the third voltage; if the second switch element is turned on and the twelfth switch element is turned off, the adjustment circuit is configured to output the second voltage; and if the second switch element and the twelfth switch element are both turned off, the adjustment circuit is configured to output the first voltage, wherein the first voltage is greater than the second voltage, and the second voltage is greater than the third voltage.

\* \* \* \* \*